(12) United States Patent
Joshi et al.

(10) Patent No.: US 9,569,544 B2
(45) Date of Patent: Feb. 14, 2017

(54) FRAMEWORK TO PERSIST AND RETRIEVE PREVIOUS SEARCHES BASED ON THE CONTEXT

(75) Inventors: Rahul K. Joshi, Dublin, CA (US); Venkata R. Gujjula, Pleasanton, CA (US); Mark D. Martin, Pleasanton, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1031 days.

(21) Appl. No.: 13/196,064

(22) Filed: Aug. 2, 2011

(65) Prior Publication Data

US 2013/0036381 A1    Feb. 7, 2013

(51) Int. Cl.
*G06F 17/30* (2006.01)

(52) U.S. Cl.
CPC ............... *G06F 17/30867* (2013.01)

(58) Field of Classification Search
CPC ............ G06F 17/3087; G06F 17/30206; G06F 17/301; G06F 17/30864; G06F 17/30973; G06F 17/30997
USPC ........................................................ 715/808
See application file for complete search history.

(56) References Cited

U.S. PATENT DOCUMENTS

| | | | |
|---|---|---|---|
| 2002/0073075 A1* | 6/2002 | Dutta et al. | 707/3 |
| 2003/0126136 A1* | 7/2003 | Omoigui | 707/10 |
| 2008/0052275 A1* | 2/2008 | Kantak | G06F 17/30663 |
| 2009/0067443 A1* | 3/2009 | Moore | H04L 41/20 370/409 |
| 2009/0077056 A1* | 3/2009 | Ravikumar et al. | 707/5 |
| 2011/0106834 A1* | 5/2011 | Blackwell | G06F 17/30873 707/769 |
| 2014/0317094 A1* | 10/2014 | Sagoo et al. | 707/722 |
| 2015/0193538 A1* | 7/2015 | Maddison | 707/706 |

OTHER PUBLICATIONS

IPCOM000028083D, "Categorization of Search Results", IP.com Prior Art Database Technical Disclosure, Apr. 22, 2004.*

* cited by examiner

*Primary Examiner* — Jennifer To
*Assistant Examiner* — Joseph R Burwell
(74) *Attorney, Agent, or Firm* — Kilpatrick Townsend & Stockton LLP

(57) ABSTRACT

Embodiments of the invention provide for persisting and retrieving search results based on a context of the search results and an application providing those results. For example, one embodiment of the present invention allows a user to access previous search result from a current page of a user interface, e.g., by clicking on an icon in the interface page. Additionally, these previous results can be made available without requiring the user to leave a current page in order to view the saved results. For example, the previous results can be indicated and accessible through an icon on the breadcrumb menu that, upon the user clicking of otherwise selecting the icon, causes the user interface to render the previous search results in a pop up dialog without leaving the current page.

21 Claims, 9 Drawing Sheets

| | SetID | Product ID | Description | Product Use | Model Number |
|---|---|---|---|---|---|
| SHARE | ANNUAL_MAINT | Annual Maintenance | Contracts | (blank) |
| SHARE | ARENA_1 | Basketball Arena | Contracts | (blank) |
| SHARE | BUILDING 2 | Office Building 2 | Contracts | (blank) |
| SHARE | BUILDING1 | Office Building 1 | Contracts | (blank) |
| SHARE | BUILDING10 | BUILDING10 | Contracts | (blank) |
| SHARE | BUILDING3 | Building 3 | Contracts | (blank) |
| SHARE | CABUILDING | CABUILDING | Contracts | (blank) |
| SHARE | CACAFE | CAFE_90 | Contracts | (blank) |
| SHARE | CAFETERIA | Cafeteria | Contracts | (blank) |
| SHARE | CALAND | LAND90-LN | Contracts | (blank) |
| SHARE | CA_INTERIOR_DESIGN | DESIGN90 | Contracts | (blank) |
| SHARE | CONS-ALLOCATIONS | Consulting-GL Allocations | Contracts | (blank) |
| SHARE | CONS-CUSTOM | Consulting - Customize | Contracts | (blank) |
| SHARE | CONS-DESIGN | Consulting-Implementn Design | Contracts | (blank) |
| SHARE | CONS-ESA | CONSULTING-ESA ENHANCEMENTS | Contracts | (blank) |
| SHARE | CONS-INSTALL | Consulting - Installation | Contracts | (blank) |
| SHARE | CONS-SAM | CONSULTING-SVCS ACCTG MODEL | Contracts | (blank) |
| SHARE | CONS-TRAIN | Consulting - Training | Contracts | (blank) |
| SHARE | CONS-WORKFLOW | Consulting-Workflow Implement | Contracts | (blank) |
| SHARE | CONS_ESA_ALLOCATIO | ALLOCATION | Contracts | (blank) |
| SHARE | CONS_ESA_CUSTOMIZE | CUSTOMIZE | Contracts | (blank) |
| SHARE | CONS_ESA_DESIGN | ESA DESIGN | Contracts | (blank) |
| SHARE | CONS_ESA_IMPLEMENT | ESA IMPLEMENT | Contracts | (blank) |
| SHARE | CONS_ESA_INSTALL | ESA INSTALLATION | Contracts | (blank) |
| SHARE | CONS_ESA_WORKFLOW | ESA WORKFLOW | Contracts | (blank) |

FRAMEWORK TO PERSIST AND RETRIEVE PREVIOUS SEARCHES BASED ON THE CONTEXT

BACKGROUND OF THE INVENTION

Embodiments of the present invention relate generally to methods and systems for providing improved navigation in a user interface and access to search results therein and more particularly to and persisting and retrieving search results through the user interface based on a context for the results.

Search is one of the primary mechanisms for an enterprise application user to get to a particular transaction he is interested in. For example, the user usually starts with entering a search term to get a result set. There are then different possible scenarios on what the user may end up doing with this search result. In some cases, based on the result set summary, the user can look for a transaction of interest and click on it to go a detail page for that transaction. If the user determines that is not the transaction he is looking for, he has to go back to the search results page and click on another row and repeat it until he finds the desired transaction. That is, the user has to go back and forth between the results page and the detail pages. In another case, the user may update a set of transactions by navigating to each one and making changes to each transaction. For example, starting with a search, the user gets a set of results, i.e., transactions to be updated. The user then clicks on the first one, updates the transaction through the detail page, and saves the transaction. He then goes back to the search results page to select the next transaction and repeats the updating processes. Again in this case, the user has to navigate back and forth from the results page leaving his current context. In yet another scenario, the user can perform a search in one particular context of the enterprise application, i.e., related to a particular function of the enterprise application, related to a particular business object, etc. Then the user may leave that context to some other context, e.g., leave a recruiting pr personnel function of the enterprise application to work in an accounting function thereof. Later, the user may return to the initial context and want to continue where he left off with the previous result list. However, the previous results are not saved so, at this point, the user needs to re-do the previous search with the previous search terms to obtain a set of results before continuing.

In the above cases, the user has to flip between pages or screens which results in the user losing context of the current page. Additionally, when leaving a particular context and then returning, the user needs to repeat the search even if he is looking for the same result set as in a previous search in that context. Hence, there is a need for improved methods and systems for persisting and retrieving search results through a user interface based on context.

BRIEF SUMMARY OF THE INVENTION

Embodiments of the invention provide systems and methods for persisting and retrieving search results through the user interface based on a context of the results and an application providing those results. According to one embodiment, a method for persisting and retrieving search results can comprise receiving a search request at an application executing on a first computer system maintaining a repository of information. The request can include a set of search criteria. The first computer system can perform a search of the repository of information for one or more objects matching the search criteria and generate a set of results from performing the search. The set of results can include an indication of each of the one or more objects matching the search criteria and metadata defining a context of the application for the results. The set of results can be sent from the first computer system to a client application executing on a second computer system.

The second computer system can receive the set of results and save the set of results in a client storage maintained by the client application. The second computer system can also load a user interface page for the application. The user interface page can include metadata identifying a context of the application for the user interface page. A determination can be made by the second computer system whether the client storage contains one or more saved sets of results with metadata defining a context of the application for the results that matches the context indicated by the metadata of the user interface page. In response to determining the client storage contains one or more saved sets of results with metadata defining a context of the application for the results that matches the context indicated by the metadata of the user interface page, the second computer system can present the user interface page with an indication of available search results. For example, the indication of available search results can comprise an icon on the user interface page. In another example, the indication of available search results can comprise a menu selection of a menu of the user interface page.

A selection of the indication of available search results can be received at the second computer system which can retrieve the one or more saved sets of search results with metadata defining a context of the application for the results that matches the context indicated by the metadata of the user interface page. The retrieved one or more saved sets of search results with metadata defining a context of the application for the results that matches the context indicated by the metadata of the user interface page can be presented by the second computer system without navigating away from the presented user interface page. For example, presenting the retrieved one or more saved sets of search results with metadata defining a context of the application for the results that matches the context indicated by the metadata of the user interface page without navigating away from the presented user interface page comprises presenting the one or more saved sets of search results in a pop-up window.

According to another embodiment, a system can comprise a server for persisting and retrieving search results. The server can comprise a processor and a memory communicatively coupled with and readable by the processor. The memory can have stored therein a sequence of instructions which, when executed by the processor, causes the processor to receive a search request at an application executing on the server and maintaining a repository of information. The request can include a set of search criteria. The server can perform a search of the repository of information for one or more objects matching the search criteria, generate a set of results from performing the search, the set of results including an indication of each of the one or more objects matching the search criteria and metadata defining a context of the application for the results, and send the set of results in response to the search request.

The system can also comprise a client system. The client system can comprise a processor and a memory communicatively coupled with and readable by the processor. The memory can have stored therein a sequence of instructions which, when executed by the processor, causes the processor to receive the set of results from the server system at a client application executing one the client system and save the set of results in a client storage of the client system maintained by the client application. The client system can also load a user interface page for the application executing on the server. The user interface page can include metadata identifying a context of the application for the user interface page. The client system can determine whether the client storage contains one or more saved sets of results with metadata defining a context of the application for the results that matches the context indicated by the metadata of the user interface page. In response to determining the client storage contains one or more saved sets of results with metadata defining a context of the application for the results that matches the context indicated by the metadata of the user interface page, the client system can present the user interface page with an indication of available search results.

The client system can receive a selection of the indication of available search results and retrieve the one or more saved sets of search results with metadata defining a context of the application for the results that matches the context indicated by the metadata of the user interface page. The retrieved one or more saved sets of search results with metadata defining a context of the application for the results that matches the context indicated by the metadata of the user interface page can then be presented without navigating away from the presented user interface page.

In some cases, saving the set of results in a client storage of the client system can further comprise saving in the client storage the search criteria used to generate the set of results.

In such cases, retrieving the saved search results can further comprise retrieving the saved search criteria. Presenting the retrieved one or more saved sets of results can also include presenting a control indicating the saved search criteria. In response to a selection of the control, the retrieved search criteria can be presented for editing.

According to yet another embodiment, a machine-readable memory can have stored thereon a sequence of instructions which, when executed by a processor, causes the processor to persist and retrieve search results by sending a search request to an application executing on a server maintaining a repository of information. The request can include a set of search criteria. A set of results can be received from the server system. The set of results can include an indication of each of one or more objects matching the search criteria and metadata defining a context of the application for the results. The set of results can be saved in a client storage. A user interface page for the application can be loaded from the server system. The user interface page can include metadata identifying a context of the application for the user interface page. A determination can be made as to whether the client storage contains one or more saved sets of results with metadata defining a context of the application for the results that matches the context indicated by the metadata of the user interface page. In response to determining the client storage contains one or more saved sets of results with metadata defining a context of the application for the results that matches the context indicated by the metadata of the user interface page, the user interface page can be presented with an indication of available search results. A selection of the indication of available search results can be received and the one or more saved sets of search results with metadata defining a context of the application for the results that matches the context indicated by the metadata of the user interface page can be retrieved and presented without navigating away from the presented user interface page.

BRIEF DESCRIPTION OF THE DRAWINGS

FIG. 4 is a screenshot illustrating an exemplary user interface including an indication of a saved search according to one embodiment of the present invention.

FIG. 5 is a screenshot illustrating an exemplary user interface including a presentation of previous search results according to one embodiment of the present invention.

FIG. 8 is a screenshot illustrating an exemplary user interface including a presentation of previous search results according to one embodiment of the present invention.

DETAILED DESCRIPTION OF THE INVENTION

Figure 1:
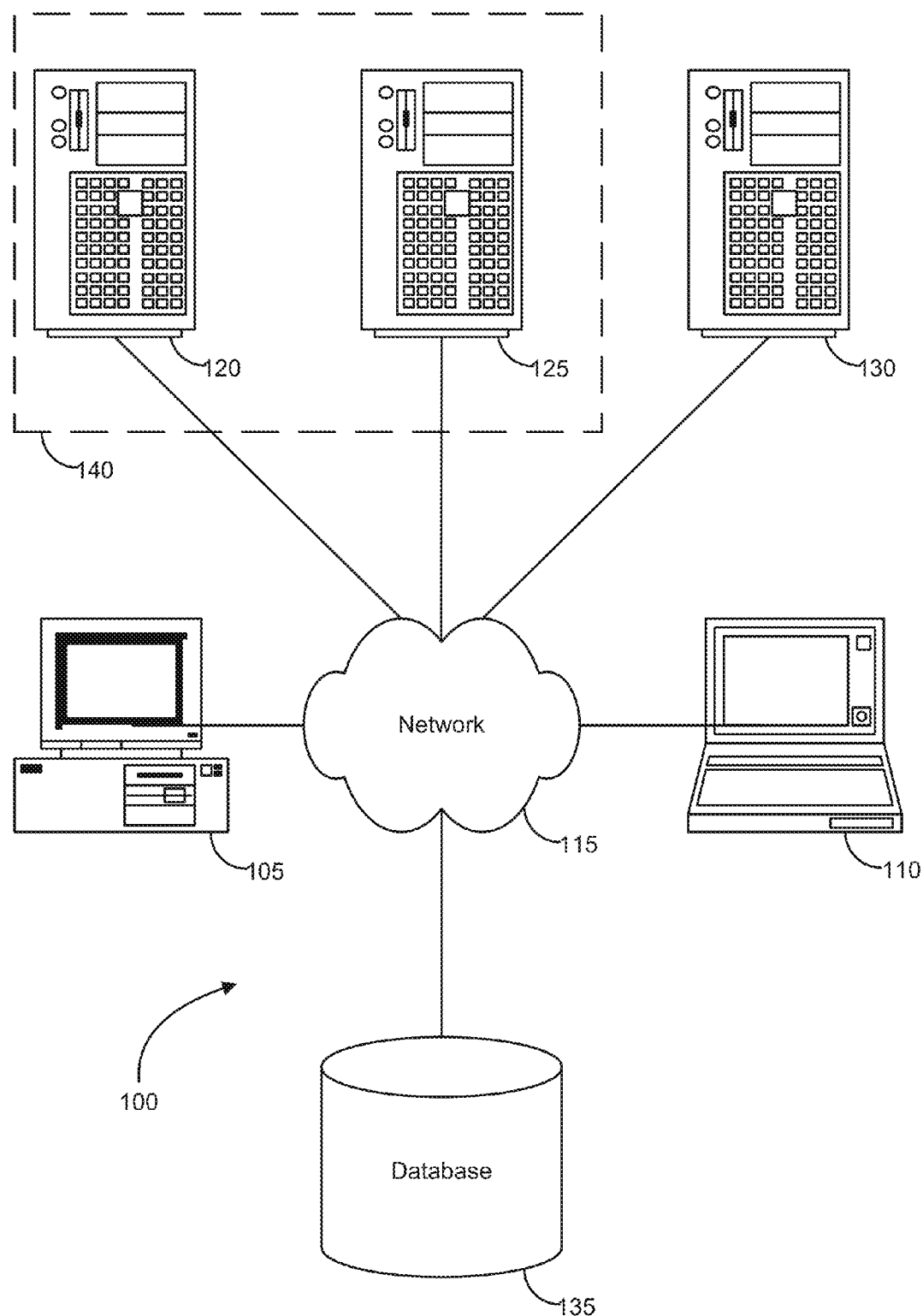
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for improved navigation in a user interface and access to search results. More specifically, embodiments of the present invention provide for persisting and retrieving search results based on a context of the search results and an application providing those results. Embodiments of the present invention provide improved navigation and access to search results for the user as well as provide for persisting and accessing previous search results for a particular context.

For example, one embodiment of the present invention allows a user to access previous search result from a current page of a user interface, e.g., by clicking on an icon in the interface page. This persistent search framework ties a users search results to the context or business component it was performed against and makes it available to the user from multiple places like a breadcrumb menu or a favorites menu. Therefore, the user has access to the previous search results from the top menu or can access it anytime from anywhere in the application from the favorites menu. Additionally, these previous results can be made available without requiring the user to leave a current page in order to view the saved results. For example, the previous results can be indicated and accessible though an icon on the breadcrumb menu that, upon the user clicking of otherwise selecting the icon, causes the user interface to render the previous search results in a pop up dialog without leaving the current page. Additionally, according to one embodiment, these results can be provided quickly by using client-side storage. That is, as will be illustrated in the figures and described in greater detail below, results can be stored, for example in the browser's memory, but retrieved for a particular context when a page is loaded that is related to that context. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server (s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
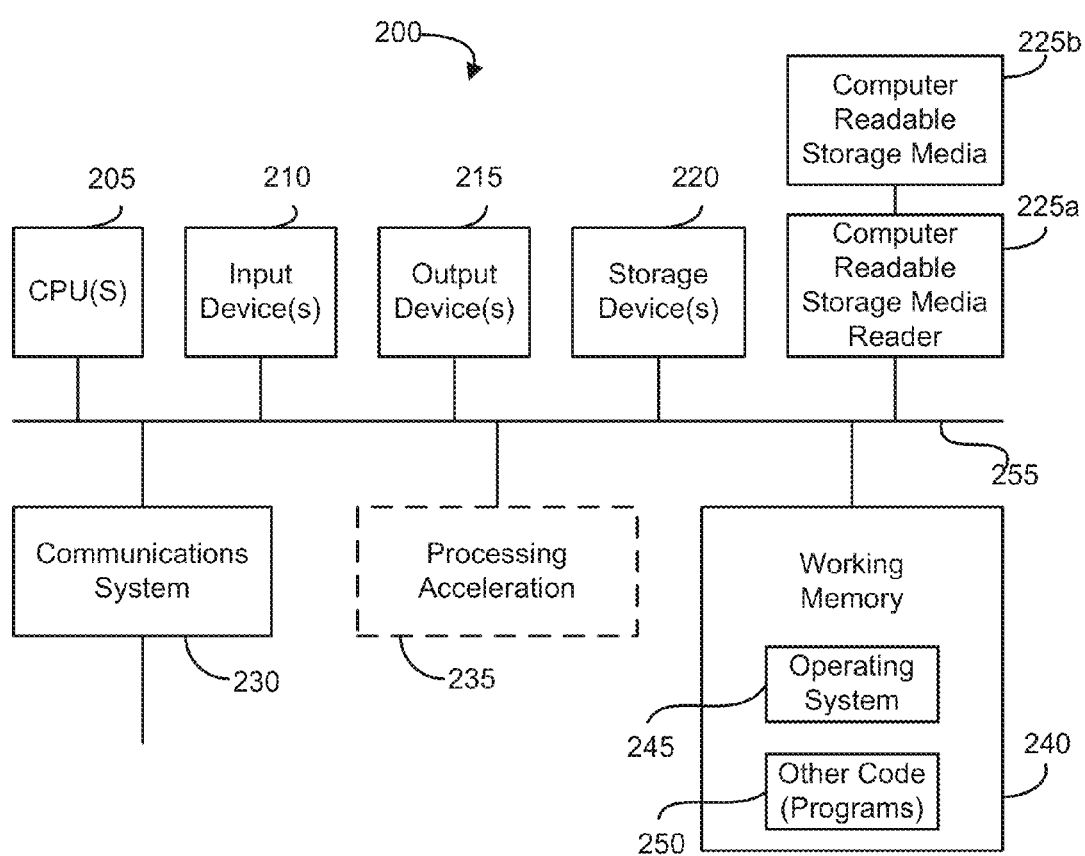
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
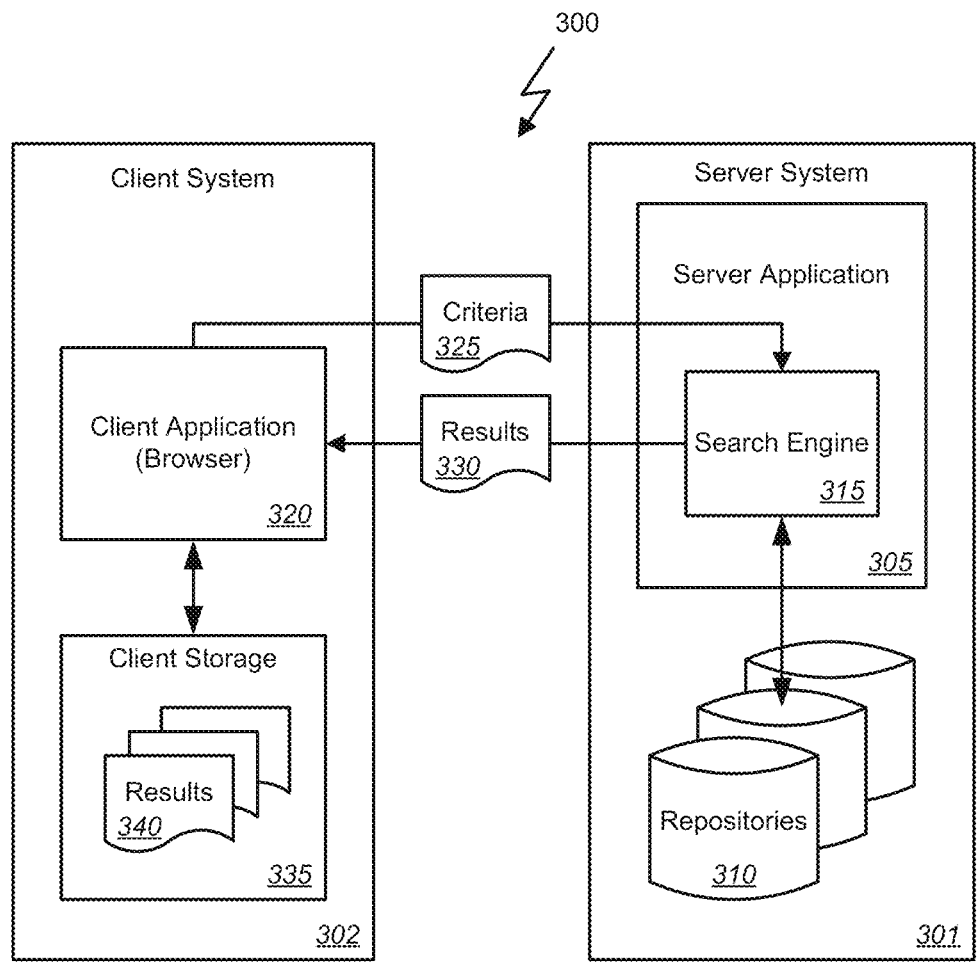
FIG. 3 is a block diagram illustrating, at a high-level, functional components of a system for persisting and retrieving previous searches based on context according to one embodiment of the present invention.

FIG. 3 is a block diagram illustrating, at a high-level, functional components of a system for persisting and retrieving previous searches based on context according to one embodiment of the present invention. In this example, the system 300 consists of a server system 301 and a client system 302. These systems 301 and 302 can be communicatively coupled, for example, over the Internet or other network (not shown here) as described above. It should be understood that, while described here as a server system 301 and a client system 302, these systems 301 and 302, in other implementations, may comprise a peer-to-peer or other arrangement.

The server system 301 may execute a server application 305 such as an enterprise application 305. However, embodiments of the present invention should not be considered to be limited to use with an enterprise application. Rather, embodiments of the present invention are thought to be equally applicable and useful with any application to which context is relevant. An enterprise application is given as one example of such an application 305 since it utilizes various business objects and functions that are illustrative of different contexts. Regardless of the exact type of application, server application 305 can access and maintain information in one or more repositories 310. While shown here as part of server system 301, it should be understood that these repositories 310 may be external to the server system 301 in different implementations. Regardless of the exact location of these repositories 310, server application 305 can access and maintain information therein, for example, related to various business objects of the server application 305. Additionally, server application 305, perhaps through a search engine 315 which may be part of or separate from server application 305, can perform searches on the business objects or other information stored in the repositories 310.

The client system 302 can include a client application 320 for accessing and/or interacting with the server application 305. For example, the client application 320 may comprise a web browser. For example, the client application 320 may access or the server application which provides an interface page such as a web page to be rendered on the client system 302 by the client application 320. One example of such a page is a search page though which a user of the client system 302 can enter search terms or criteria for the server application 305 to perform a search of the information stored in repositories 310. These criteria 325 can be sent from the client application 320 to the server application 305 which in turn runs a search on the information of the repositories 310 and returns to the client application 320 a set of results, i.e., information from the repositories 310 found to match search criteria 325. These results 330 can comprise a page, e.g., a web page containing a list of matching results, to be rendered on the client system 302 by the client application 320.

So for example, a user of the client application 320 may start by directing the client application 320 to a search page of the server application 305 and entering search terms through that page. A page of results 330 can be returned by the server application 305 to the client application 320 and rendered for viewing by the user. The user can then, for example, pick a result of interest, e.g., by clicking or otherwise selecting a result from a list of results, and can drill down to details of that business object, transaction, etc. According to one embodiment, when one result is selected and the details thereof presented, rather than forcing the user to navigate back to the results page, e.g., hit the back button on the browser, to see the list of results, an option is provided to allow the user to see the list of search results without leaving the details of the currently selected object. Additionally or alternatively, if the user leaves the context of the current search, e.g., the user leaves a search for a recruiting function of the server application 315 for another function of the server application 305 like an expense report function, when returning to the original context, the previous search results can be made available again rather than forcing the user to do another search with the same criteria as used before. Exemplary interfaces illustrating this type of navigation of search results are described in greater detail below with reference to FIGS. 4-6. However generally speaking, the interface rendered by the client application 320 can include an icon or other indication. Upon selection of this icon, previous search results for a give context of the server application can be presented, for example in a hover layer or pop-up window.

According to one embodiment, the context of the server application 305 for a set of search results 330 provided to the client application 320 can be indicated in metadata included in the results 330. That is, the server application 305 when generating a page of search results 330 to be returned to the client application 320, can add to that page a set of metadata defining the then current context of the server application 305, i.e., identifying the underlying business object or server application function. This metadata can then function as a key for that set of results 330. Additionally, once the results 330 are received by the client application 320, a copy of those results 340 can be saved in local client storage 335 maintained by the client application, e.g., browser client storage. In some cases, the search criteria used for that search may also be saved in the client storage. Then, when a subsequent page of the server application 305 is loaded by the client application 320, a check can be made by the client application 320 of metadata included in that new page and that identifies a context of the server application 305. That is, each page presented to the client application 320 by the server application 305 can include metadata defining the business object, functions, etc. of the server application 305 for which that page is presented. This metadata can be used to check the client storage 335 for saved search results 340 related to the same context, i.e., that have matching metadata. If found, the client application 320, when rendering the provided page, can include the indication of the available saved search results with matching context. If the indication is then clicked or selected by the user, the saved previous search results 340 can be retrieved by the client application 320 from client storage 335 and rendered on the user interface as a hover layer or pop-up on the present page. Such checking of the client storage 340, presenting the indication of the available previous search results, and presenting the previous search results upon selection of the indication can be accomplished, for example, based on a script or other code of the page provided by the server application.

Stated another way, persisting and retrieving previous searches based on context can begin with one system, e.g., the client system 302 executing a client application 320 such as a browser, receiving search criteria. For example, the client system 302 can receive through a page presented to the user by the browser or other client application 320 a set of conditions selected or defined by the user to be the basis of a search for objects in a particular context of the application such as described above. Once received, these criteria 325 can be sent in a request to the server 301 or other system to perform the search.

The search request can be received at an application 305 executing on the o server 301. As noted, the server 301 can maintain a repository 310 of information which can be the target of the requested search. A search of the repository 310 of information can be performed by the application 305 and/or a search engine 315 to identify one or more objects from the repositories 310 matching the search criteria. Once the search is completed, the server 301 can generate a set of results 330 from performing the search. The set of results 330 can include an indication of each of the one or more objects matching the search criteria and metadata defining a context of the application 305 for the results. For example, the metadata may define the context as related to a particular function or module of the server application 305 which the client application 320 is accessing and through which the search is invoked and/or performed. Once generated, the set of results 330 can be sent from the server 301 to the client application 320.

The client 302 can receive the set of results 330 and save the received set of results 340 in a client storage 335 maintained by the client application 320. For example, the client application 320 may comprise a browser and saving the results 340, along with the included metadata, can comprise saving the results 340 in the client storage 335 of the browser. Additionally, while not shown here for the sake of simplicity, the search results may be displayed by the client application 320, e.g., in the form of a list of objects or in another form. The user can the then navigate through the results and details of those results such as described herein. For example, the client application 320 can load a page related to a current context of the server application 305 and allow the user to view and select results, view details of those results, and again view results but without navigating backwards to a previous page, i.e., away from the currently viewed details.

At some point, the client application 320 can load a user interface page for the server application 305. For example, the client 302, through a browser or other client application 320, can request, receive, and view a page related to a particular function or other context of the server application 305. The user interface page can include metadata identifying the context of the application 305 for the user interface page. That is, the metadata of the viewed page can identify the page as related to that particular function or other context of the server application 305. A check can then be made of the client storage 335 or other local storage of the client 302 of whether a set of previous search results 340 related to the current context is saved therein. That is, a determination can be made by the client 302 as to whether the client storage 335 contains one or more saved sets of results 340 with metadata defining a context of the application for the results that matches the context indicated by the metadata of the user interface page.

Figures 4, 5:
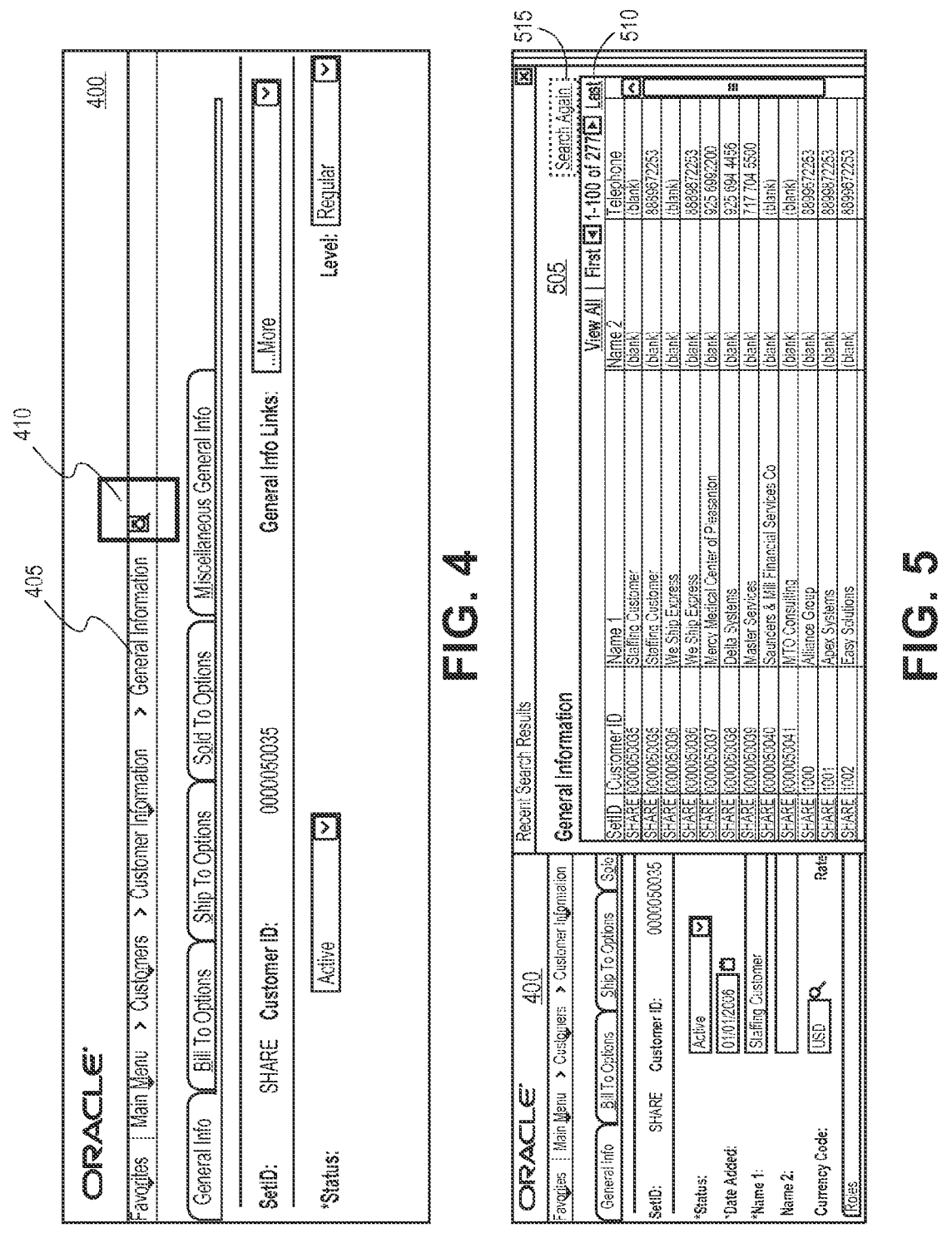
Figure 6:
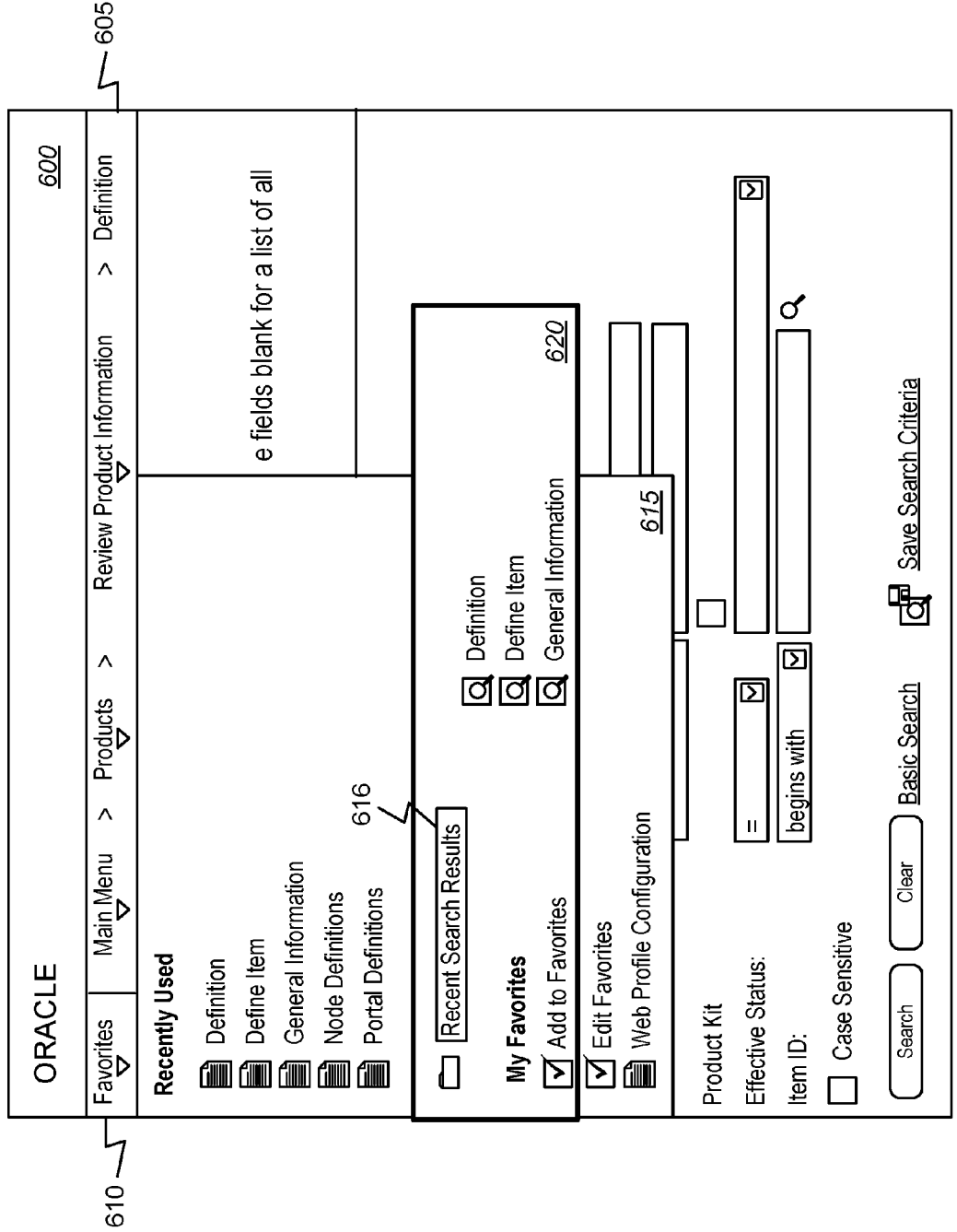
FIG. 6 is a screenshot illustrating an exemplary user interface for accessing previous search results from a menu according to one embodiment of the present invention.

In response to determining the client storage 335 contains one or more saved sets of results 340 with metadata defining a context of the application 305 for the results that matches the context indicated by the metadata of the user interface page, an indication of available search results can be presented in or with the user interface page. For example, the indication of available search results can comprise an icon on the user interface page such as illustrated in FIG. 4 and described below. In another example, the indication of available search results can comprise a menu option of a menu of the user interface page as illustrated in FIG. 6 and described below. Other variations are contemplated and considered to be within the scope of the present invention. In any case, the user may click or select or otherwise indicate a choice of the indication of available results to view those results.

Upon receiving or detecting a selection of the indication of available search results, the one or more saved sets of search results 340 with metadata defining a context of the application 305 for the results that matches the context indicated by the metadata of the user interface page can be retrieved by the client application 320. These results can then be presented in the user interface by the client application 320 without navigating away from the presented user interface page. For example, presenting the retrieved one or more saved sets of search results 340 with metadata defining a context of the application 305 for the results that matches the context indicated by the metadata of the user interface page without navigating away from the presented user interface page can comprise presenting the one or more saved sets of search results 340 in a hover layer or pop-up window such as illustrated in FIG. 5 and described below.

FIG. 4 is a screenshot illustrating an exemplary user interface including an indication of a saved search according to one embodiment of the present invention. This example includes a page 400 such as a web page generated by a server application as described above and provided to a client application, e.g., a web browser, for displaying some aspect of the server application in some particular context. In this example, an indication of available previous search results is shown in the form of an icon 410. In cases where there are no available previous search results related to the context of the server application represented in the current page 400, this icon 410 is not displayed. When the icon 410 is displayed, it can be shown as part of a breadcrumbs navigation menu 405 as illustrated here. Conveniently, such a representation in a breadcrumbs navigation menu 405 indicates a context of the current page 400 in the server application. For example, as illustrated here, the icon represents last search results done on the Customer Information business component of the server application.

It should be understood that, while represented here as an icon 410 presented in a breadcrumbs navigation menu 405, such an implementation is not required. Rather, the exact format and arrangement of the user interface page 400 and indication of available previous search results can vary significantly from that illustrated here without departing from the scope of the present invention. Regardless of the exact representation, embodiments of the present invention make saved search results accessible without navigating away from the current page 400. One such example is illustrated in FIG. 5.

FIG. 5 is a screenshot illustrating an exemplary user interface including a presentation of previous search results according to one embodiment of the present invention. More specifically, this example illustrates the page 400 from FIG. 4 after the user has clicked or otherwise selected the icon 410 representing available previous search results. As shown, the user does not have to leave the current page 400 in the main window as the results show up in a pop up window 505 or a hover layer over the current page 400. This window 505 can include the previous search results such as a list 510 of objects matching provided search criteria. The elements of this list 510 may comprise links or selectable icons etc for navigating to a page representing a transaction, object, etc. for that result. Additionally or alternatively, the pop up window 505 may include a link 515, button, icon, or other element for resetting the search results and/or performing another search. According to one embodiment, selection of a "Search Again" link 515 such as shown here can cause the user interface to display a page including the search criteria for the current search and through which the user may add or edit the criteria for another search. Details of an example of such a page will be described below with reference to FIG. 7. Again, the exact format, content, etc. of the user interface can vary significantly from that illustrated here without departing from the scope of the present invention.

For example, FIG. 6 is a screenshot illustrating an exemplary user interface for accessing previous search results from a menu according to one embodiment of the present invention. More specifically, this user interface page 600 represents accessing previous search results 620 for other components from the menu 615. As shown here, this page 600 includes a breadcrumbs navigation menu 605, and a drop-down menu 615 for a selected menu item 610. Within the drop-down menu 615 an item 616 can be selected for which previous search results are available. Selection of that item 616 can cause the pop-up window 620 to open for displaying those search results.

Figure 7:
FIG. 7 is a screenshot illustrating an exemplary user interface for presenting previous search criteria according to one embodiment of the present invention.

FIG. 7 is a screenshot illustrating an exemplary user interface for presenting previous search criteria according to one embodiment of the present invention. As noted with reference to FIG. 5, the pop up window 505 or hover layer through which previous search results are presented may include a link 515, button, icon, or other element for resetting or changing the search results and/or performing another search. According to one embodiment, selection of a "Search Again" link 515 such as shown in FIG. 5 can cause the user interface to display a page 700 including the search criteria for the current search and through which the user may add or edit the criteria for another search. An example of such a page 700 is shown here in FIG. 7.

In this example, the page 700 includes a set of elements 705 for selecting and/or specifying the search criteria. These elements 705 can include any of a variety of textboxes, combo-boxes, checkboxes, radio buttons, buttons, icons, etc. Also included can be a list 710 of the search results for the previous search conducted with the displayed criteria. Additionally or alternatively, the page 700 can include a number of controls 715, 720, and 725 such as button, icons, links, etc., for controlling the search. For example, these controls can include, but are not limited to, a search button 715 for initiating a search with the currently specified criteria in elements 705, a clear button 720 for deleting or resetting the criteria specified in elements 705, and a save link 725 for saving the currently specified search criteria indicated in elements 705. Again, the exact format, content, etc. of the user interface can vary significantly from that illustrated here without departing from the scope of the present invention.

FIG. 8 is a screenshot illustrating an exemplary user interface including a presentation of previous search results according to one embodiment of the present invention. Similar to the example of FIG. 5, this example illustrates a page 80000 after the user has clicked or otherwise selected the icon representing available previous search results as described above. As noted, the user need not leave or navigate away from the current page 800 in the main window as the results are shown in a pop up window 805 or a hover layer over the current page 800. This window 805 can include the previous search results such as a list 810 of objects matching provided search criteria. As shown here, the pop up window 805 may include a link 815, button, icon, or other element for refining or editing the search criteria used for the previous search for which the results are shown. According to one embodiment, selection of a "Refine Search" link 815 such as shown here can cause the user interface to display a page as described above with reference to FIG. 7 and including the search criteria for the current search and through which the user may add or edit the criteria for another search.

Figure 9:
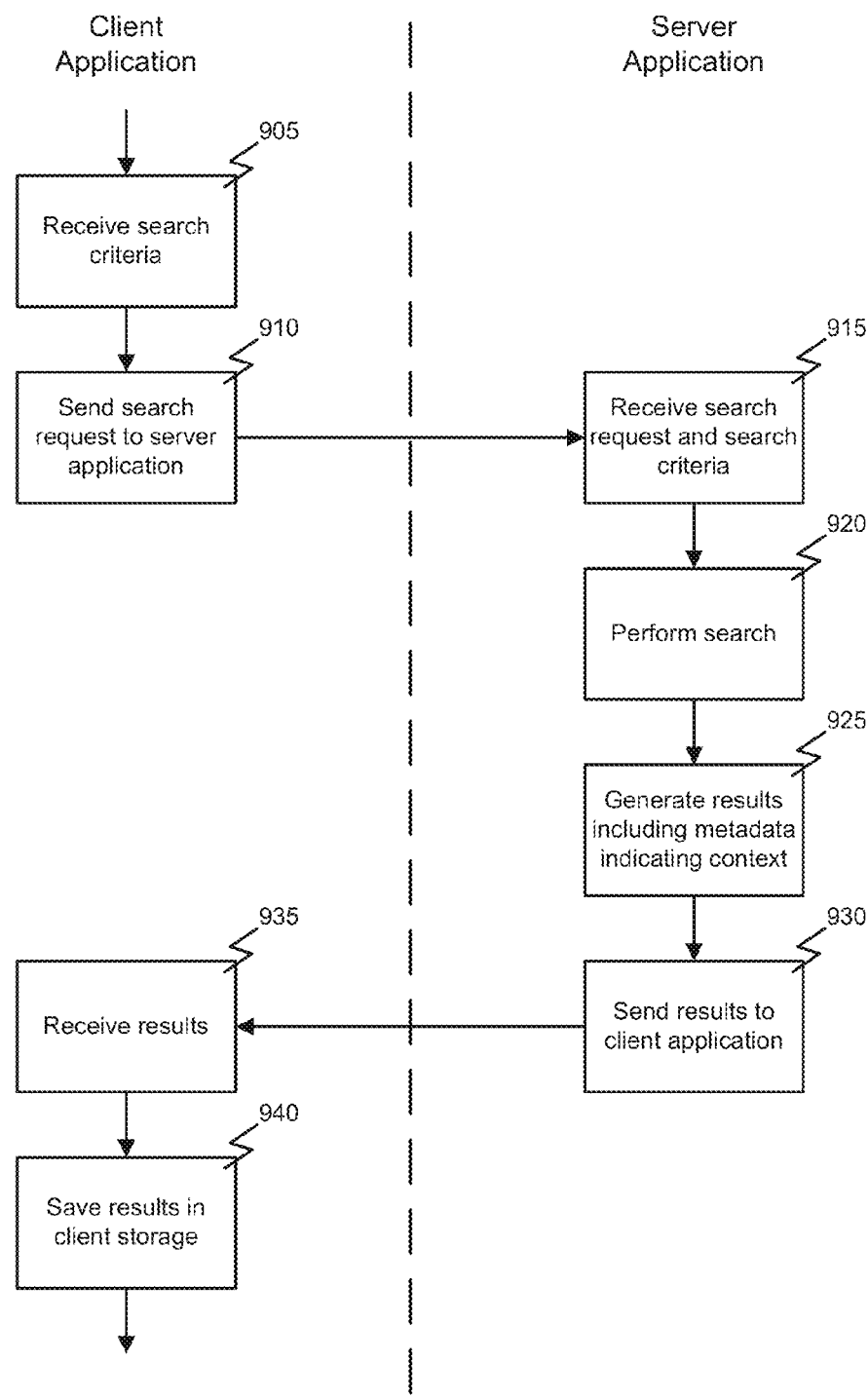
FIG. 9 is a flowchart illustrating a process for persisting and retrieving previous searches based on context according to one embodiment of the present invention.

FIG. 9 is a flowchart illustrating a process for persisting and retrieving previous searches based on context according to one embodiment of the present invention. In this example, the process can begin with one system, e.g., the client system described above executing a client application such as a browser, receiving 905 search criteria. For example, the client system can receive through a page presented to the user by the browser or other client application a set of conditions selected or defined by the user to be the basis of a search for objects in a particular context of the application such as described above. Once received 905, these criteria can be sent 910 in a request to the server or other system to perform the search.

The search request can be received 915 at an application executing on the other computer system, e.g., the server described above. As noted, the server can maintain a repository of information which can be the target of the requested search. A search of the repository of information can be performed 920 to identify one or more objects matching the search criteria. Once the search is completed, the server or other system can generate 925 a set of results from performing the search. The set of results can include an indication of each of the one or more objects matching the search criteria and metadata defining a context of the application for the results. For example, the metadata may define the context as related to a particular function or module of the server application which the client application is accessing and through which the search is invoked and/or performed. Once generated, the set of results can be sent 930 from the server to the client application.

The client can receive 935 the set of results and save 940 the received set of results in a client storage maintained by the client application. In some cases, saving 940 the set of results can also include saving the search criteria used to perform the search. For example and as noted above, the client application may comprise a browser and saving the results, along with the included metadata, and in some cases the search criteria, can comprise saving the results in the client storage maintained by the browser. Additionally, while not shown here for the sake of simplicity, the search results may be displayed by the client application, e.g., in the form of a list of objects or in another form. The user can the then navigate through the results and details of those results such as described herein. For example, the client application can load a page related to a current context of the server application and allow the user to view and select results, view details of those results, and again view results but without navigating backwards to a previous page, i.e., away from the currently viewed details, as described above and in the following.

Figure 10:
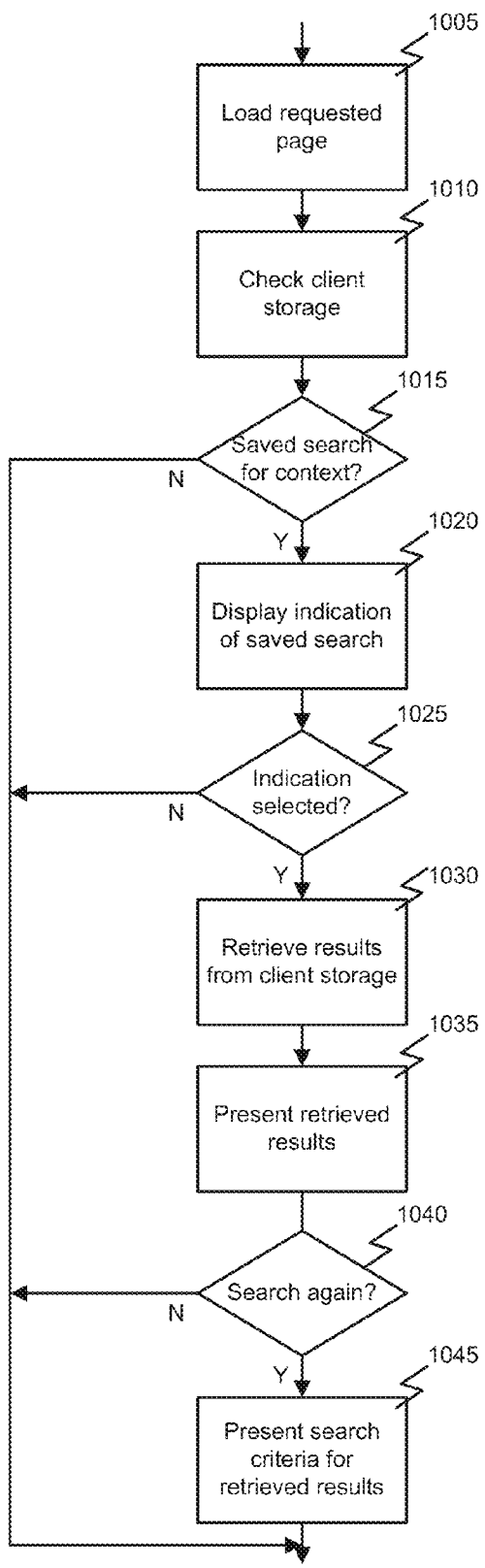
FIG. 10 is a flowchart illustrating a process for retrieving previous searches based on context according to one embodiment of the present invention.

FIG. 10 is a flowchart illustrating a process for retrieving previous searches based on context according to one embodiment of the present invention. In this example, the process can begin with the client loading 1005 a user interface page for the application. For example, the client, through a browser or other client application, can request, receive, and view a page related to a particular function or other context of the server application. The user interface page can include metadata identifying the context of the application for the user interface page. That is, the metadata of the viewed page can identify the page as related to that particular function or other context of the server application. A check 1010 can then be made of the client storage or other local storage of the client of whether a set of previous search results related to the current context is saved therein. That is, a determination 1015 can be made by the client as to whether the client storage contains one or more saved sets of results with metadata defining a context of the application for the results that matches the context indicated by the metadata of the user interface page.

In response to determining 1015 the client storage contains one or more saved sets of results with metadata defining a context of the application for the results that matches the context indicated by the metadata of the user interface page, an indication of available search results can be presented in or with the user interface page. For example, the indication of available search results can comprise an icon on the user interface page such as illustrated in FIG. 4 and described above. In another example, the indication of available search results can comprise a menu option of a menu of the user interface page as illustrated in FIG. 6 and described above. Again, other variations are contemplated and considered to be within the scope of the present invention. In any case, the user may click or select or otherwise indicate a choice of the indication of available results to view those results.

Upon receiving 1025 or detecting a selection of the indication of available search results, the one or more saved sets of search results with metadata defining a context of the application for the results that matches the context indicated by the metadata of the user interface page can be retrieved 1030. These results can then be presented 1035 in the user interface without navigating away from the presented user interface page. For example, presenting the retrieved one or more saved sets of search results with metadata defining a context of the application for the results that matches the context indicated by the metadata of the user interface page without navigating away from the presented user interface page can comprise presenting the one or more saved sets of search results in a hover layer or pop-up window such as illustrated in FIG. 5 and described above.

Also as described above, the client can also save in client storage the search criteria used to generate of identify the search results. In such cases, the search criteria may also be retrieved when the saved search results are retrieved 1030. Additionally and as described above, the page in which the previous search results are presented 1035 can include a button, link, icon, or other indication or control which, when selected, can cause the saved search criteria to be presented. Therefore, the process can also include, in some cases, determining 1040 whether such a selection is made and, in response to determining 1040 a selection of a "refine search" or "search again" control is made, the saved search criteria can be presented 1045 for editing such as in a page as illustrated in FIG. 7 and described above.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for persisting and retrieving search results, the method comprising:
   receiving, at a time of receipt, a search request at a server application executing on a first computer system maintaining a repository of information, the server application performing a plurality of different functions, the request including search criteria and having been generated by a client application executing on a second computer system;
   identifying a context of the server application corresponding to a particular function of the plurality of different functions being performed for the client application at the server application at the time of receipt;
   performing, by the first computer system, a search of the repository of information for one or more objects matching the search criteria, wherein the search of the repository of information is invoked through the function of the server application which the client application was accessing;
   generating by the first computer system, a set of results from performing the search that includes an indication of each of the one or more objects matching the search criteria and metadata identifying the context of the server application for the results;
   sending the set of results from the first computer system to the client application executing on the second computer system;
   determining, subsequent to the sending the set of results, that the second computer system is reengaging in the context, the determination including:
      detecting that a new user interface page being or to be presented at the second computer system corresponds to the metadata; and
   in response to the determination, facilitating a presentation, at the second computer system and in association with the new user interface page, that includes an indication of available search results.

2. The method of claim 1, further comprising:
   receiving the set of results at the second computer system; and
   saving the set of results in a client storage of the second computer system maintained by the client application.

3. The method of claim 2, further comprising:
   receiving, at the second computer system, a selection of the indication of available search results;
   retrieving, by the second computer system, the one or more saved sets of search results; and
   presenting, by the second computer system, the retrieved one or more saved sets of search results without navigating away from the presented new user interface page.

4. The method of claim 3, wherein presenting the retrieved one or more saved sets of search results without navigating away from the presented user interface page comprises presenting the one or more saved sets of search results in a pop-up window.

5. The method of claim 1, further comprising:
   loading, by the second computer system, the new user interface page, the new user interface page including second metadata identifying the context of the server application,
   wherein the detecting that the new user interface page being or to be presented at the second computer system corresponds to the metadata includes determining that the second metadata identifies a new context of the server application that matches the context.

6. The method of claim 1, wherein facilitating the presentation includes presenting, by the second computer system, the new user interface page with the indication of available search results.

7. The method of claim 1, wherein the indication of available search results comprises an icon on the new user interface page.

8. The method of claim 1, wherein the indication of available search results comprises a menu selection of a menu of the new user interface page.

9. The method of claim 1, wherein the server application comprises an enterprise application.

10. The method of claim 1, wherein the client application comprises a browser.

11. The method of claim 1, further comprising:
    detecting, at the second computer system, a selection of a result of the set of results;
    presenting, at the second computer system, a results interface page corresponding to the result, wherein the new user interface page includes the results interface page.

12. The method of claim 1, further comprising:
    determining, subsequent to the sending the set of results but before the determining that the second computer system is reengaging in the context, that the second computer system is engaging in a different context.

13. A system comprising a server system for persisting and retrieving search results, the server system comprising:
    one or more processors; and
    a memory communicatively coupled with and readable by the one or more processors and having stored therein a sequence of instructions which, when executed by the one or more processors, causes the one or more processors to:
       receive, at a time of receipt, a search request at a server application executing on the server system and maintaining a repository of information, the server application performing a plurality of different functions, the request including search criteria and having been generated by a client application executing on a client computer system;

identify a context of the server application corresponding to a particular function of the plurality of different functions being performed for the client application at the server application at the time of receipt;

perform a search of the repository of information for one or more objects matching the search criteria, wherein the search of the repository of information is invoked through the function of the server application which the client application was accessing;

generate a set of results from performing the search that includes an indication of each of the one or more objects matching the search criteria and metadata identifying the context of the server application for the results;

send the set of results in response to the search request to the client application executing on the client computer system;

determine, subsequent to the sending the set of results, that the client computer system is reengaging in the context, the determination including:
  detecting that a new user interface page being or to be presented at the client computer system corresponds to the metadata; and
  in response to the determination, facilitate a presentation, at the client computer system and in association with the new user interface page, that includes an indication of available search results.

14. The system of claim 13, further comprising the client computer system, the client computer system comprising:
one or more client-system processors; and
a memory communicatively coupled with and readable by the one or more client-system processors and having stored therein a client-system sequence of instructions which, when executed by the one or more client-system processors, cause the one or more client-system processors to:
  receive the set of results from the server system at a client application executing on the client computer system; and
  save the set of results in a client storage of the client computer system maintained by the client application.

15. The system of claim 14, wherein the client computer system further:
receives a selection of the indication of available search results;
retrieves the one or more saved sets of search results; and
presents the retrieved one or more saved sets of search results without navigating away from the presented user interface page.

16. The system of claim 15, wherein:
saving the set of results in a client storage of the client computer system further comprises saving in the client storage the search criteria used to generate the set of results;
retrieving the saved search results further comprises retrieving the saved search criteria;
presenting the retrieved one or more saved sets of search results includes presenting a control indicating the saved search criteria and the client computer system further, in response to a selection of the control, presents the retrieved search criteria for editing.

17. The system of claim 13, wherein the client computer system further:
loads the new user interface page for the new user interface page including metadata identifying the context of the server application, wherein the detecting that the new user interface being or to be presented at the second computer system corresponds to the metadata includes determining that the second metadata identifies a new context of the server application that matches the context; and
wherein facilitating the presentation includes presenting the new user interface page with the indication of available search results.

18. A machine-readable memory device having stored thereon a sequence of instructions which, when executed by one or more processors, causes the one or more processors to persist and retrieve search results by:
sending a search request to a server application executing on a server system maintaining a repository of information, the server application performing a plurality of different, the request including search criteria;
receiving a set of results from the server system, the set of results including:
  an indication of each of one or more objects matching the search criteria; and
  metadata identifying a context of the server application for the results, the context of the server application having been identified as corresponding to a particular function of the plurality of different functions of the server application being performed for the client application at a time of receiving the search request;
saving the set of results in a client storage;
presenting, at a presentation time, a user interface page that identifies at least some of the set of results;
detecting, subsequent to the presentation time, that a new user interface page being presented or to be presented corresponds to the metadata; and
in response to the detection, presenting an indication of available search results.

19. The machine-readable memory device of claim 18, further comprising:
receiving a selection of the indication of available search results;
retrieving the one or more saved sets of search results to create retrieved one or more saved sets of search results; and
presenting the retrieved one or more saved sets of results without navigating away from the presented new user interface page.

20. The machine-readable memory device of claim 19, wherein presenting the retrieved one or more saved sets of search results without navigating away from the presented new user interface page comprises presenting the one or more saved sets of search results in a pop-up window.

21. The machine-readable memory device of claim 19, wherein:
saving the set of results in a client storage of the client system further comprises saving in the client storage the search criteria used to generate the set of results;
retrieving the saved search results further comprise retrieving the saved search criteria;
presenting the retrieved one or more saved sets of search results includes presenting a control indicating the saved search criteria; and the sequence of instructions further cause the one or more processors to, in response to a selection of the control, present the retrieved search criteria for editing.

* * * * *

UNITED STATES PATENT AND TRADEMARK OFFICE
CERTIFICATE OF CORRECTION

Page 1 of 1

PATENT NO. : 9,569,544 B2
APPLICATION NO. : 13/196064
DATED : February 14, 2017
INVENTOR(S) : Rahul K. Joshi et al.

It is certified that error appears in the above-identified patent and that said Letters Patent is hereby corrected as shown below:

On the Title Page

Column 2, Item (74) Attorney, Agent, or Firm, Delete "Kilpatick" and insert -- Kilpatrick --.

In the Specification

In Column 1, Lines 38-39, delete "leave a recruiting pr personnel function" and insert -- leave a recruiting personnel function --.

In Column 5, Line 59, Delete "though" and insert -- through --.

In Column 8, Line 65, Delete "though" and insert -- through --.

In the Claims

In Column 18, Line 24, In Claim 18, delete "different," and insert -- different functions, --.

Signed and Sealed this
Twenty-eighth Day of May, 2019

Andrei Iancu
*Director of the United States Patent and Trademark Office*